March 6, 1928.
H. E. BOWEN
MEAT SEASONING FORK
Filed March 17, 1927
1,661,595
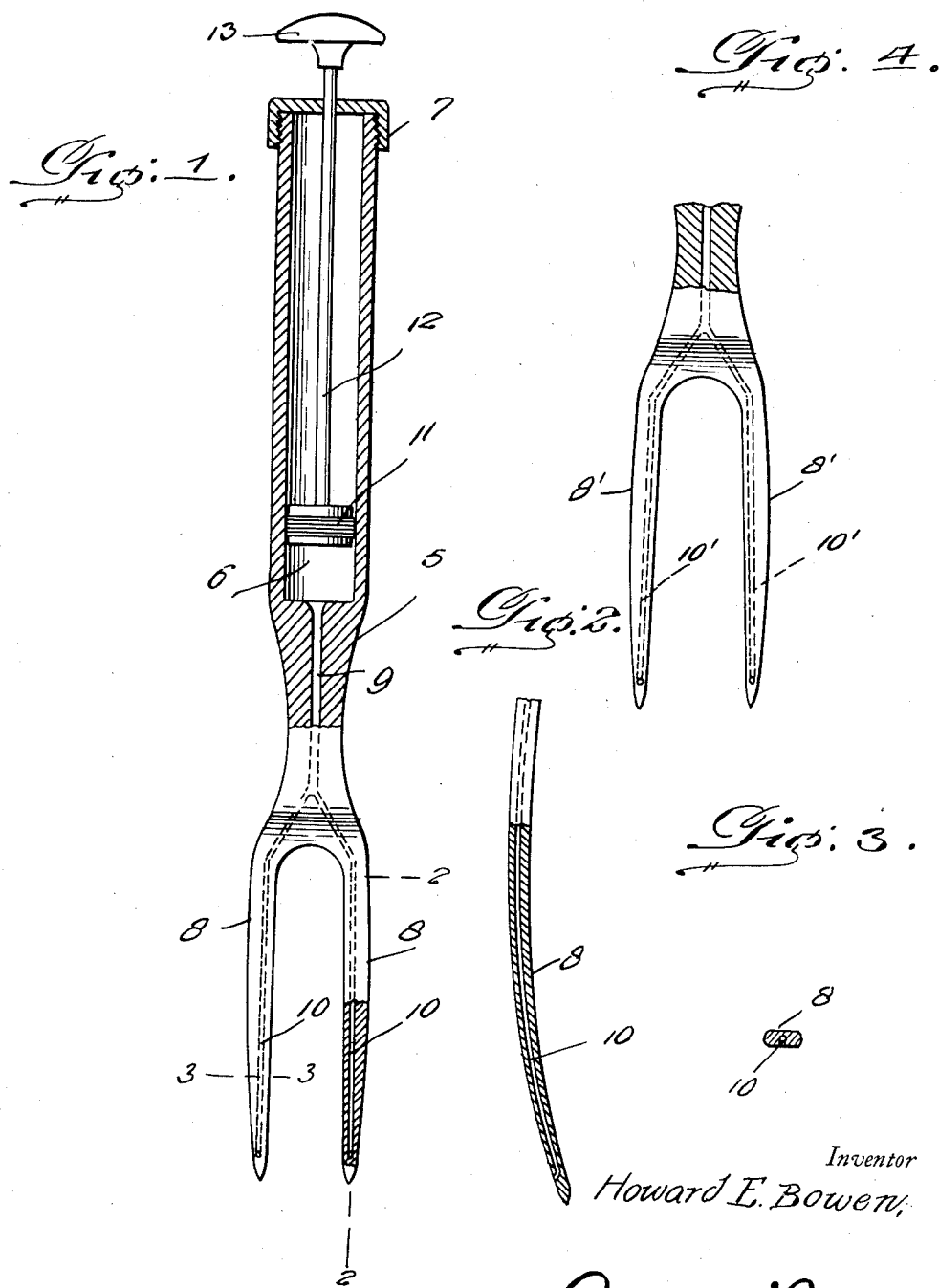
Inventor
Howard E. Bowen,
By Clarence A. O'Brien
Attorney Patented Mar. 6, 1928.

1,661,595

UNITED STATES PATENT OFFICE.

HOWARD E. BOWEN, OF BALTIMORE, MARYLAND.

MEAT-SEASONING FORK.

Application filed March 17, 1927. Serial No. 176,029.

This invention relates to new and useful improvements in forks, and aims to provide a particularly constructed fork equipped for receiving a supply of seasoning material, and further so constructed that when the tines of the fork are injected into the meat, said seasoning material may be projected therefrom and through the tines resulting in the proper seasoning of the food during the cooking thereof and in order that said seasoning material may be injected into the center of the meat so that the same will spread throughout its entire area.

An important object of the invention is to provide a fork of the aforementioned character that may be used not only for the injection of seasoning into meat, but that also may be used in substitution of the various characters of forks now employed in the turning over of roasts or other food being cooked, boiled, or the like.

With the foregoing and other objects in view as the nature of the invention will be better understood, the same comprising the novel form, combination and arrangement of parts hereinafter more fully described, shown in the accompanying drawing and claimed.

In the drawing wherein like reference characters indicate corresponding parts throughout the several views:

Figure 1 is a view mainly in longitudinal cross section of a seasoning fork constructed in accordance with the present invention.

Figure 2 is an enlarged longitudinal section through one of the fork tines taken substantially upon the line 2—2 of Figure 1.

Figure 3 is a detail transverse section of one of the tines taken substantially upon the line 3—3 of the same figure, and Figure 4 is a rear elevation of the tines disclosing the discharge ends of the bores within the tines through which the seasoning material is forced as being at the rear sides of the tines rather than one being at one side and the other the opposite, as in Figure 1.

Now having particular reference to the drawing, my novel seasoning fork consists of a handle shank 5, the major length of which is of tubular formation so as to provide an elongated cylinder 6, the outer end of which is externally screw threaded for receiving a closure cap 7. Formed upon the opposite end of this handle shank is a pair of curved fork tines 8—8, the ends of which are pointed as clearly disclosed in the various figures. Beneath the cylindrical end of the shank said shank is formed with a central bore 9 communicating with the interior of the tube and having communication with bores 10—10 formed longitudinally through the tines 8—8. In Figure 1 the end of one bore 10 terminates at the back side and inside, while the bore of the other tine terminates at the opposite side so that as the seasoning material is forced therethrough it will be directed into reverse direction.

Obviously the cylinder 6 of the fork is to receive a supply of seasoning material and in order that this seasoning material may be projected from the cylinder into the bores 9 and 10—10 respectively, there is provided a rectilinearly movable piston 11 mounted within the cylinder and upon the inner end of a piston rod 12, which rod is movable through an opening in the center of the cap 7 and is provided at its outer end with a push knob 13. It will at once be apparent that after the tines 8—8 have been projected into the meat a pressure upon the knob 13 will cause the forcing of the seasoning material from the cylinder through the outlet of the bores 10—10 and the tines 8—8 so that the meat will be thoroughly seasoned.

In Figure 4, the bores 10'—10' of the tines 8'—8' terminate at similar sides of the tines so that the seasoning material is only projected in one direction when the tines are forced into the meat.

In view of the foregoing description when considered in conjunction with the accompanying drawing it will be apparent that I have provided a highly novel, simple, and inexpensive meat seasoning fork that is well adapted for all the purposes heretofore designated, and even though I have herein shown and described the invention as consisting of certain detail structural elements it is nevertheless to be understood that some changes may be made therein without affecting the spirit and scope of the appended claim.

Having thus described the invention, what I claim is:—

In a meat seasoning fork of the class described, a shank, a handle on one end of the shank constructed to provide a seasoning material cylinder open at its outer end, a cap removably disposed over the open end of the cylinder, a pair of tines formed on the other end of the shank, each tine being provided with a longitudinal bore, the outer ends of the bores terminating inwardly of the pointed ends of the tines, the outer end of the bore of one tine being disposed for communication with the rear side of said tine, the outer end of the bore of the other tine communicating with the opposite side, said shank being formed with a bore for affording communication between the cylinder and the inner ends of the bore in the tines, and a manually operable material ejecting piston arranged within the cylinder.

In testimony whereof I affix my signature.

HOWARD E. BOWEN.